METHOD OF DESTROYING INSECTS WITH PYRETHRUM

Filed March 8, 1933 2 Sheets-Sheet 1

INVENTOR
Walter S. Burgess
Earl K. Golley
By Chappell & Earl
ATTORNEYS

METHOD OF DESTROYING INSECTS WITH PYRETHRUM

Filed March 8, 1933 2 Sheets-Sheet 2

INVENTOR
Walter S. Burgess
Earl K. Golley
By Chappell & Earl
ATTORNEYS

Patented Sept. 12, 1933

1,926,579

UNITED STATES PATENT OFFICE 1,926,579

METHOD OF DESTROYING INSECTS WITH PYRETHRUM

Walter S. Burgess and Earl K. Golley, Benton Harbor, Mich.

Application March 8, 1933. Serial No. 660,010

5 Claims. (Cl. 167—24)

This application is a continuation in part of our patent application Serial No. 563,312, filed September 17, 1931, with certain improvements in details.

The objects of the invention are:

First, to provide an improved method and process of destroying insects with pyrethrum.

Second, to provide such an improved method and process that is effective in destroying insects in a closed space, such as a room, in which the insecticide diffuses and enters all of the cracks and crannies where the insects are wont to hide.

Third, to provide a method and process in which the maximum effect of the material is secured, thereby effecting economy of material.

Fourth, to provide a method and process in which maximum distribution of the insecticide is secured by steam atomization of a solution of pyrethrum.

Further objects relating to details of construction and operation will appear from the detailed description to follow. A preferred form of the apparatus for carrying out our method is illustrated in the accompanying drawings, in which.

Figures 1, 2, 6:
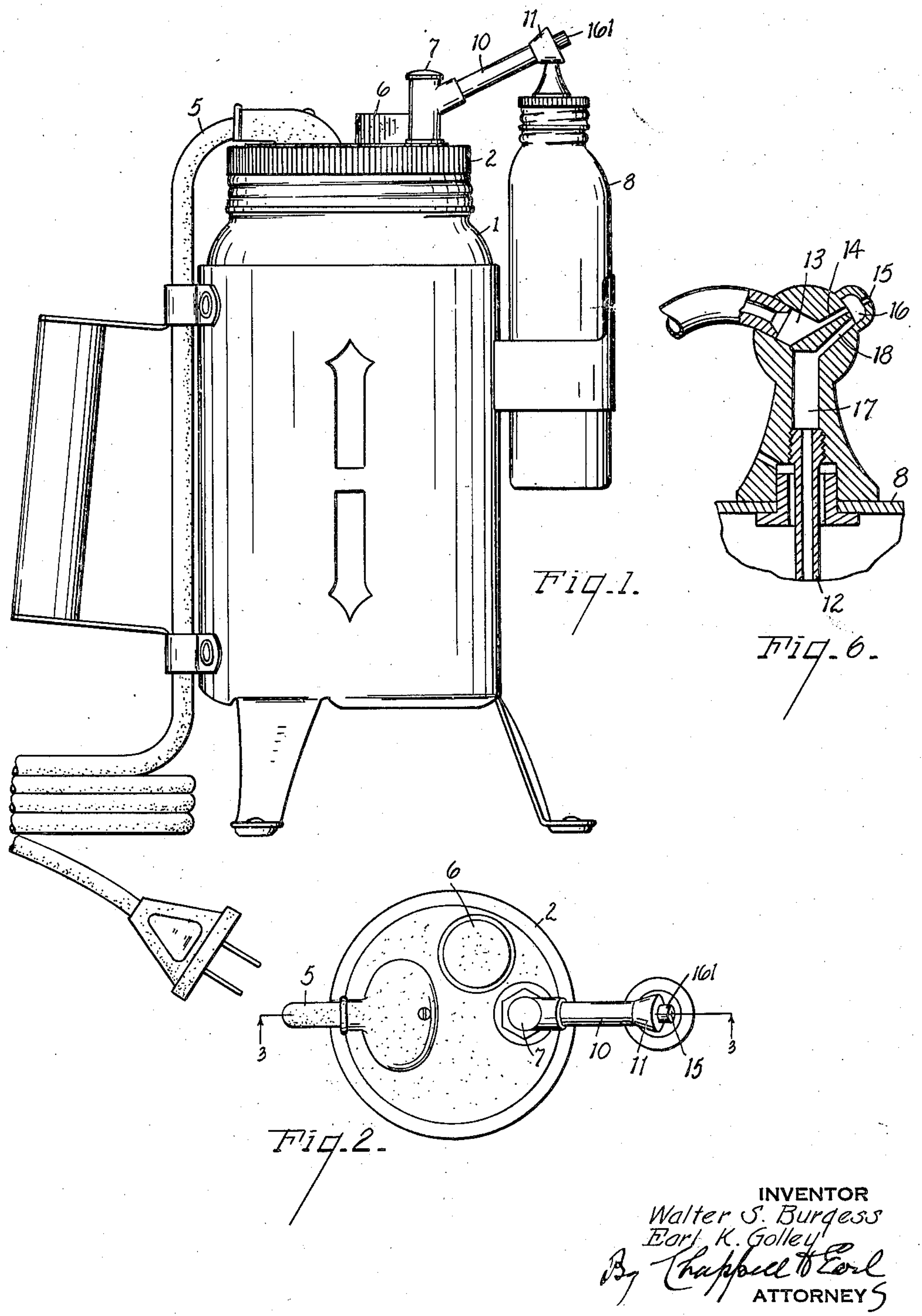
Fig. 1 is a detail side elevation view of our complete apparatus ready to plug in on an electric lamp socket.
Fig. 2 is a plan view of the cap part detached.
Fig. 6 is a detail view of the head as constructed without adjustable feature.
Figures 3, 4, 5:
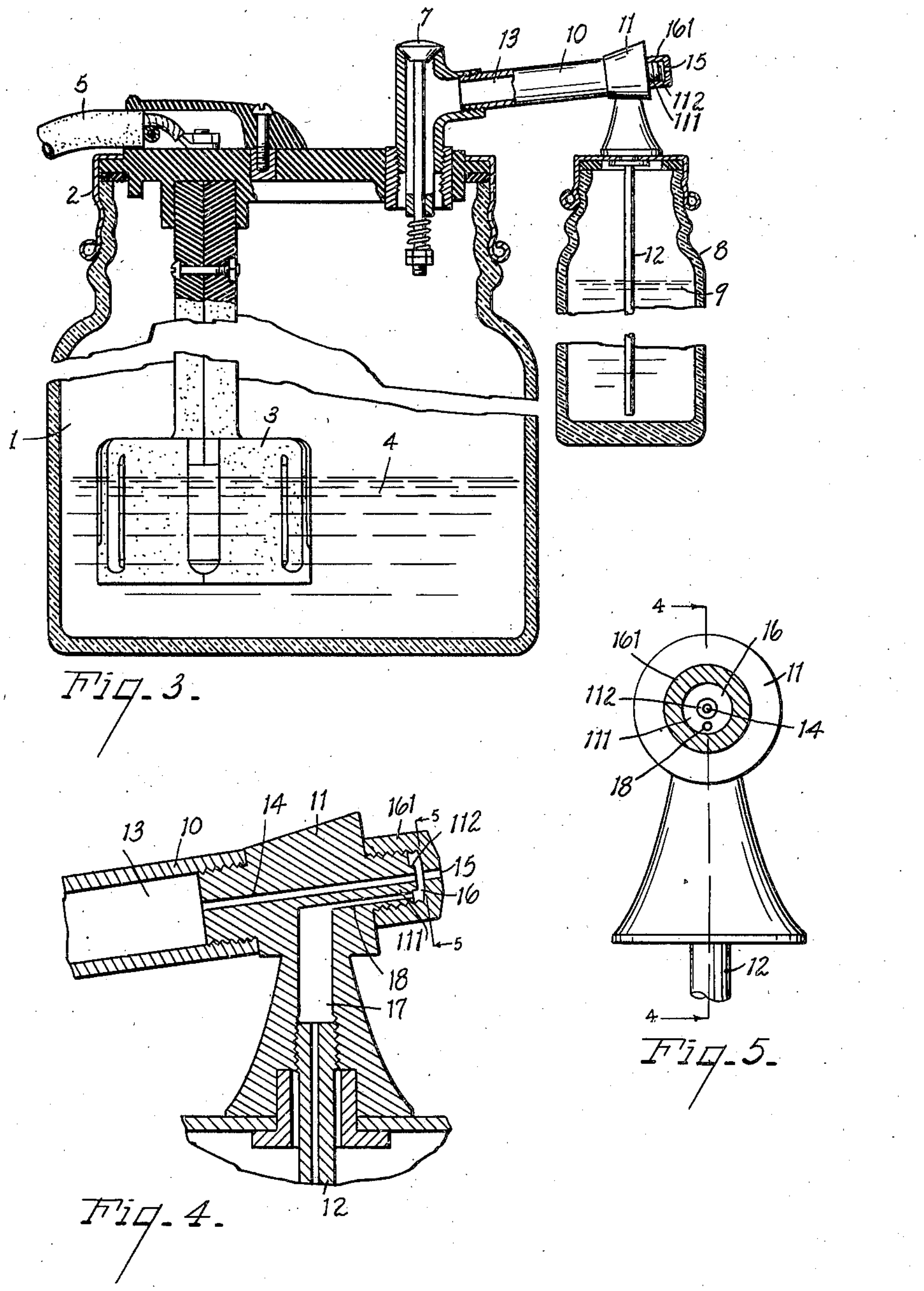
Fig. 3 is an enlarged detail vertical sectional view through our complete apparatus.
Fig. 4 is a vertical sectional view through the spray head of the diffusing and distilling apparatus, taken on line 4—4 of Fig. 5.
Fig. 5 is a detail transverse sectional view on line 5—5 of Fig. 4.

The parts will be identified by their numerals of reference which are the same in all the views.

1 is the main reservoir, preferably a strong glass jar. 2 is the metal cap screw threaded and sealed thereon. 3 is an electric heater unit disposed in the main reservoir to heat the water 4 contained therein. 5 is the electric connection for the unit connected to the cap or cover 2. 6 is the filler plug. 7 is the relief valve. 8 is the container for a pyrethrum concentrate 9. 10 is the connection to the spray or atomizer head 11 leading from the steam space of the reservoir to the said spray head 11. 12 is the supply pipe leading up from the interior of the container 8 to supply liquid concentrate to the head 11.

The spray head 11 of brass is of considerable mass to accumulate heat. Steam delivers into a chamber 13 therein from which delivers a steam jet 14 out through the spray aperture 15 from the mixing chamber 16. Tube 12 leads up into the chamber 17 in the spray head, which is connected by the spray nozzle 18 to the mixing chamber 16.

Giving attention to certain details, the chamber 16 is formed by a cap 161 which is screw threaded onto a nipple 111 which projects slightly in a nozzle at 112. The bore 14 is drilled with a number 68 drill and is .031 of an inch in diameter. The bore 15 is drilled with a number 65 drill and is .035 of an inch in diameter, or .004 of an inch larger than the bore 14. The bore 18 is drilled with a number 70 drill and is .028 of an inch in diameter. The space between the nozzle 112 and the bore 15 in the cap 161 is, at the minimum, .006 of an inch. The chamber 16 is an annular space around the same.

The relief valve 7 is set at about 8 lb. pressure and the temperature of the steam is consequently considerably above boiling point, or 212° Fahr. The head 11 presenting a considerable mass of metal is consequently quite strongly heated by the hot steam (and is a heat reservoir),—to just what temperature it is impossible to estimate, but the relations of the parts are given and the temperature resulting is high enough to do the work. While the temperature certainly very closely approaches the boiling point, it, in operation, in no way damages the pyrethrins or pyrethrum solution or concentrate. The solution or concentrate 9 is a kerosene solution made from pyrethrum flowers and kerosene or mineral oil and is a usual manufactured product known by that name and commercially sold as pyrethrum concentrate. This works exceedingly well with this apparatus. The best authorities at the present time assert that the pyrethrins or active principle of pyrethrum is not soluble in water to any appreciable extent.

While the pyrethrum concentrate, which theoretically contains a very small percent of the pyrethrins or active principle, gives satisfactory results under our process, we are aware that a much weaker solution can be made use of with corresponding results. In place of kerosene or mineral oil as a solvent we are very clear that any effective solvent for the pyrethrum will be effective in this position, it being desirable that the solvent be volatile at a different temperature from the water. It is our belief that in the operation of this apparatus an attenuated stream of the dissolved pyrethrins or pyrethrum principle is preheated by the steam as it passes to the spray head and is taken up by a comparatively small quantity of the steam in the mixing chamber 16 where the high temperature and the steam has the effect of steam distillation, distilling out and freeing the active principle, which is then projected with the steam jet through the bore 15 into the atmosphere where the whole mass discharged assumes a feather-like appearance like steam jetting from the enozzle of a teakettle.

With the apparatus as we have it, this fine jet is projected into the atmosphere four feet or more and the feather appearance disappears at that point, but the atmosphere of the room, particularly where it is distributed, appears shortly to contain a cloud which is certainly impregnated with the pyrethrum material. As soon as the water evaporates from this cloud, the pyrethrum material is released, and would certainly, if solid, be in a more finely divided condition than had been accomplished by any known means. From the action it appears that the pyrethrum material has been volatilized into a vapor which has the diffusion properties of a gas (or it may be it has been converted into a gas) and diffuses like a gas. It is impossible, in view of the minute quantity, to have any effective chemical determination on this question. It has been indicated by authorities that a temperature approaching the boiling point of water (212° F.) causes a chemical break down in the pyrethrins. We do not know that the pyrethrins are not broken down into some other material by the action of our apparatus, but if so it is a material apparently that is as toxic to insect life as the pyrethrins and apparently even more so. That is, there is a special development of pyrethrum active principle or a new product or compound. We have stated our theories in this matter so that they may be understood.

In the operation of our process and apparatus for the destruction of roaches the material at once penetrates into all recesses and crannies that have any air space connection to the body of the room. This is done where no pressure has been exerted by the spray from the apparatus. It is simply done by the diffusion. In the case of a metallic protecting shell or bell of an electric fixture, if there are roaches behind it, they at once come out, being driven out by the action of the material which has permeated through the narrow space accessible. Roaches around a door casing entirely concealed from view at once come out. Roaches behind baseboards at a point where no possible visible vapor has reached, at once come out into the open and die. We refer to this as evidence of the fact that what we have produced is a gas or a gaseous vapor having the diffusion properties of a gas. The minute quantity which does the work makes it impossible of any effective determination or chemical analysis that we have been able to accomplish or that we have been able to find out how to accomplish.

We wish to distinguish our apparatus and process from steam atomizers and their action. The object of a steam atomizer is to make use of the pressure and volume of the steam to disintegrate a liquid. The liquid, unless it is quite highly volatile, is simply broken up into particles, that is, atomized, and the steam may serve to some extent as a carrier. However, the steam usually has the same effect as a jet of air and is not quite so efficient because it immediately condenses.

We also wish to distinguish our apparatus and process from the usual construction of spray gun which are piston air pumps which deliver a jet air into an atomizer head and atomize any product in the usual way of atomizers. For the past ten years these have been used and demonstrated as of very high efficiency in the matter of household sprays. Such spray guns, however, are only partially efficient. It is necessary to direct the spray into any cranny and the usual directions are to do this for the treatment of roaches and to spray the material directly onto the roaches when they will hide and die. Our structure has no such limitation because where a room is infested with roaches and is treated with our apparatus, they come out from the crannies and in a case of bad infestation, the floor of a room will be completely covered with dead roaches so that very frequently it is not possible to walk across the floor of such a room without crushing numerous roaches under your feet.

To compare with the action of a spray gun, our apparatus and process are very effective where an oil solution containing one per cent of the active principle of pyrethrum is made use of. Our experience demonstrates that with such a solution, a substantial effect is obtained by evaporating and converting one ounce of water for an ounce of the solution; that the effectiveness increases to a maximum when we convert three ounces of water to steam in the treatment of one ounce of 1% solution of pyrethrum; that very good work is done when six ounces of water is converted to steam for each ounce of 1% pyrethrum solution. This shows a wide range of efficiency for the apparatus and process.

With this treatment, one ounce of 1% solution of pyrethrum, a usual strength of pyrethrum concentrate, will, when treated with three ounces of water converted to steam, that is 5,100 volumes of steam to the ounce of concentrate, or 510,000 times the volume of active principle, effectively treat a room of 10,000 cubic feet capacity, that is, a room 10 x 10 x 100. It will be seen that in each cubic foot of room treated, if the distribution is perfect, there will be one millionth part of an ounce of the active principle of pyrethrum.

The treatment for the destruction of moths needs to be exceedingly thorough and repeated at intervals of a few days for several times, because the treatment is not effective in destroying the insects' eggs and moths are, to quite an extent, protected by whatever they are destroying.

We have indicated precisely the dimensions of our apparatus. This apparatus has been demonstrated as of the highest efficiency in a year's commercial exploitation, so that in discussing the action of our device, we are not discussing a theory but actual practice.

We desire to claim the method and process specifically and we also desire to claim the same broadly.

Having thus described our invention, what we claim as new and desire to secure by Letters Patent is:

1. The method of destroying insects in a closed space such as a room comprising steam atomizing a solution of the active principle of pyrethrum by directing a jet of steam into said space and introducing said solution into said jet whereby the product is projected into and diffuses in said space.

2. The method of destroying insects in a closed space such as a room comprising steam atomizing a solution of the active principle of pyrethrum by directing a jet of steam into said space and introducing a small continuous stream of said solution into said jet whereby the product is projected into and diffuses in said space.

3. The method of destroying insects in a closed space such as a room comprising steam atomizing a solution in mineral oil of the active principle of pyrethrum by directing a jet of steam into said space and introducing said solution into said jet whereby the product is projected into and diffuses in said space.

4. The method of destroying insects in a closed space such as a room comprising treating the active principle of pyrethrum by steam atomization of a solution of said active principle with steam of a mass from approximately one hundred to six hundred times that of the active principle by directing a jet of said steam into said space and introducing said solution into said jet whereby said active principle is projected into and diffuses in said space.

5. The method of destroying insects in a closed space such as a room comprising treating an approximately one percent solution of the active principle of pyrethrum by steam atomization with steam of a mass from approximately one to six times that of the solution by directing a jet of said steam into said space and introducing said solution into said jet whereby the mixture is projected into and diffuses in said space.

WALTER S. BURGESS.
EARL K. GOLLEY.